Inventor
OSWALD STUART NEILL
by: J. Richard Cavanagh

June 23, 1959 O. S. NEILL 2,892,153

METHOD AND APPARATUS FOR FINDING FAULTS IN A PLURALITY OF CONDUCTORS

Filed March 19, 1956

8 Sheets-Sheet 2

Inventor
OSWALD STUART NEILL
by: J. Richard Cavanagh

Inventor
OSWALD STUART NEILL
by: J. Richard Cavanagh

June 23, 1959 O. S. NEILL 2,892,153

METHOD AND APPARATUS FOR FINDING FAULTS IN A PLURALITY OF CONDUCTORS

Filed March 19, 1956 8 Sheets-Sheet 4

Inventor
OSWALD STUART NEILL
by: J. Richard Cavanagh

Inventor
OSWALD STUART NEILL
by: J. Richard Cavanagh

June 23, 1959 O. S. NEILL 2,892,153

METHOD AND APPARATUS FOR FINDING FAULTS IN A PLURALITY OF CONDUCTORS

Filed March 19, 1956 8 Sheets-Sheet 6

Inventor
OSWALD STUART NEILL by: J. Richard Cavanagh

Inventor
OSWALD STUART NEILL
by: J. Richard Cavanagh

Inventor
OSWALD STUART NEILL
by: J. Richard Cavanagh

United States Patent Office 2,892,153

Patented June 23, 1959

2,892,153

METHOD AND APPARATUS FOR FINDING FAULTS IN A PLURALITY OF CONDUCTORS

Oswald Stuart Neill, Toronto, Ontario, Canada, assignor to The de Havilland Aircraft of Canada Limited, Toronto, Ontario, Canada Application March 19, 1956, Serial No. 572,385

20 Claims. (Cl. 324—73)

This invention relates to a method and apparatus for selectively testing a plurality of conductors or the like and for indicating faults therein.

The term "conductor" as used in this specification is intended to embrace not only an electrical conductor such as a wire but also a portion of an electrical circuit between any two points therein to which a test signal is to be applied.

While the invention is useful for testing conductors, it is also specially useful for the testing of multiple wire cables having terminal connectors. Apparatus of the invention will indicate not only faults in the wires but also faults in the connection of the wires to the terminal connectors.

Prior methods and apparatus for testing multiple wire connector fitted cables require tracing of a multitude of wires to arrays of terminals in one or more connectors at each end of the cable. The complexity of the testing procedures has necessitated the use of specially designed testing jigs in an attempt to simplify testing operations and thus reduce the opportunity for human error. The great variety of special test jigs which must be provided for the testing of the multiple wire cables required, for example, for any aircraft installation of a given type presents, aside from the investment involved, a test procedural problem requiring special operator training for each cable testing job. Examples might be given of similar problems in other industries where the providing of electrical circuitry cables and the like presents an ever growing complexity and demand for skilled operators which must be trained for each new testing job.

It is accordingly the main object of the present invention to provide a method and apparatus for testing a plurality of conductors whereby the special training of test operators may be substantially alleviated and the utilization of special testing jigs substantially eliminated.

It is another object of the invention to provide a method and apparatus of general application to the testing of a plurality of conductors.

Other objects of the invention will be appreciated by a study of the following specification taken in conjunction with the accompanying drawings.

Figure 14:
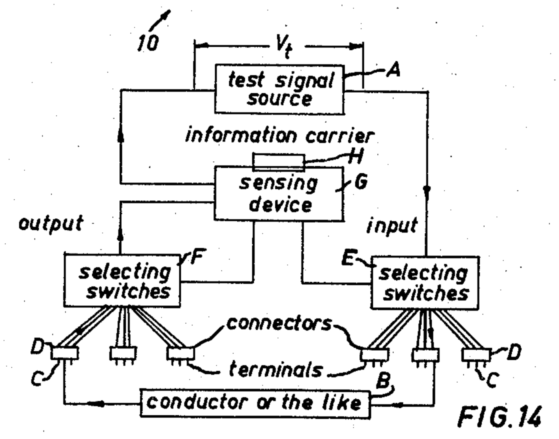
Figure 8:
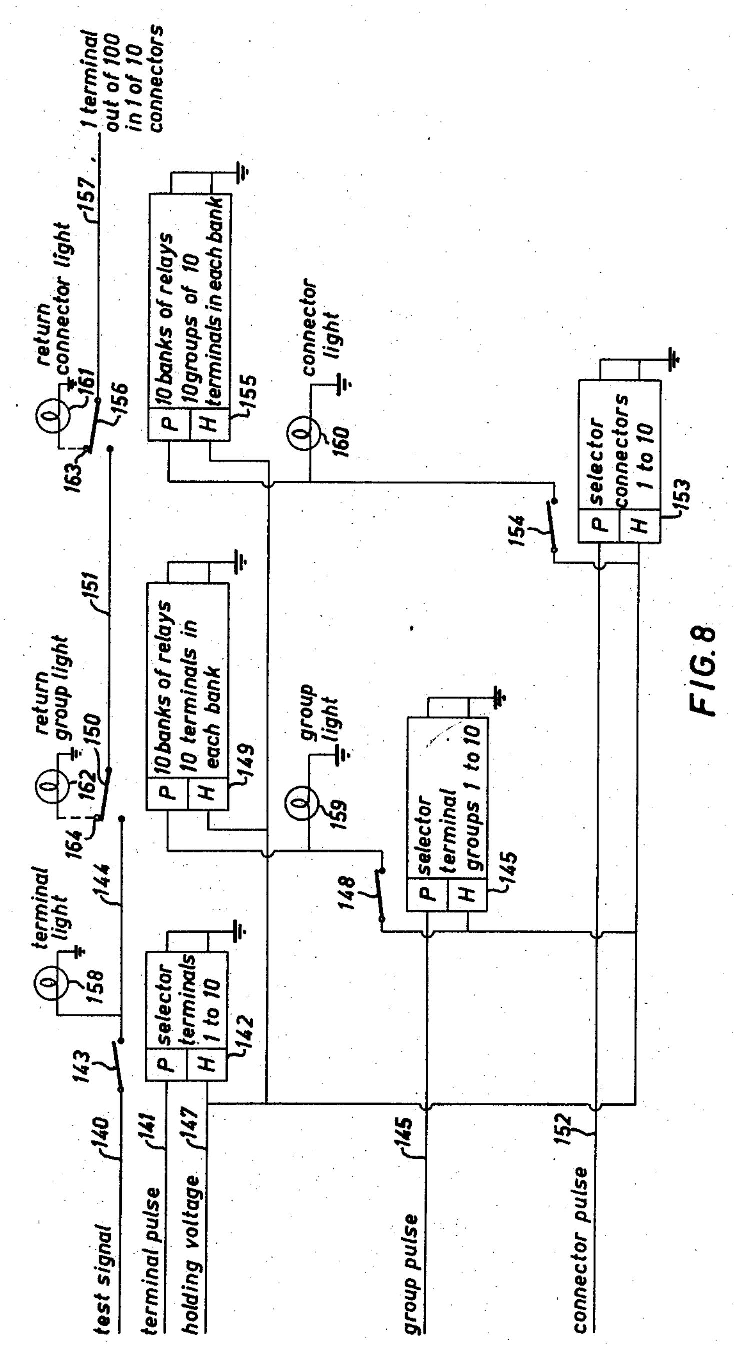
Figure 9:
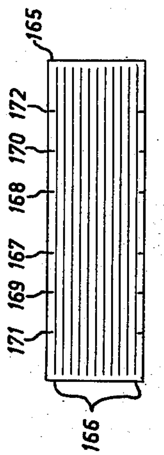
Figure 10:
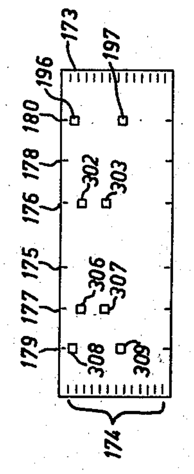
Figure 11:
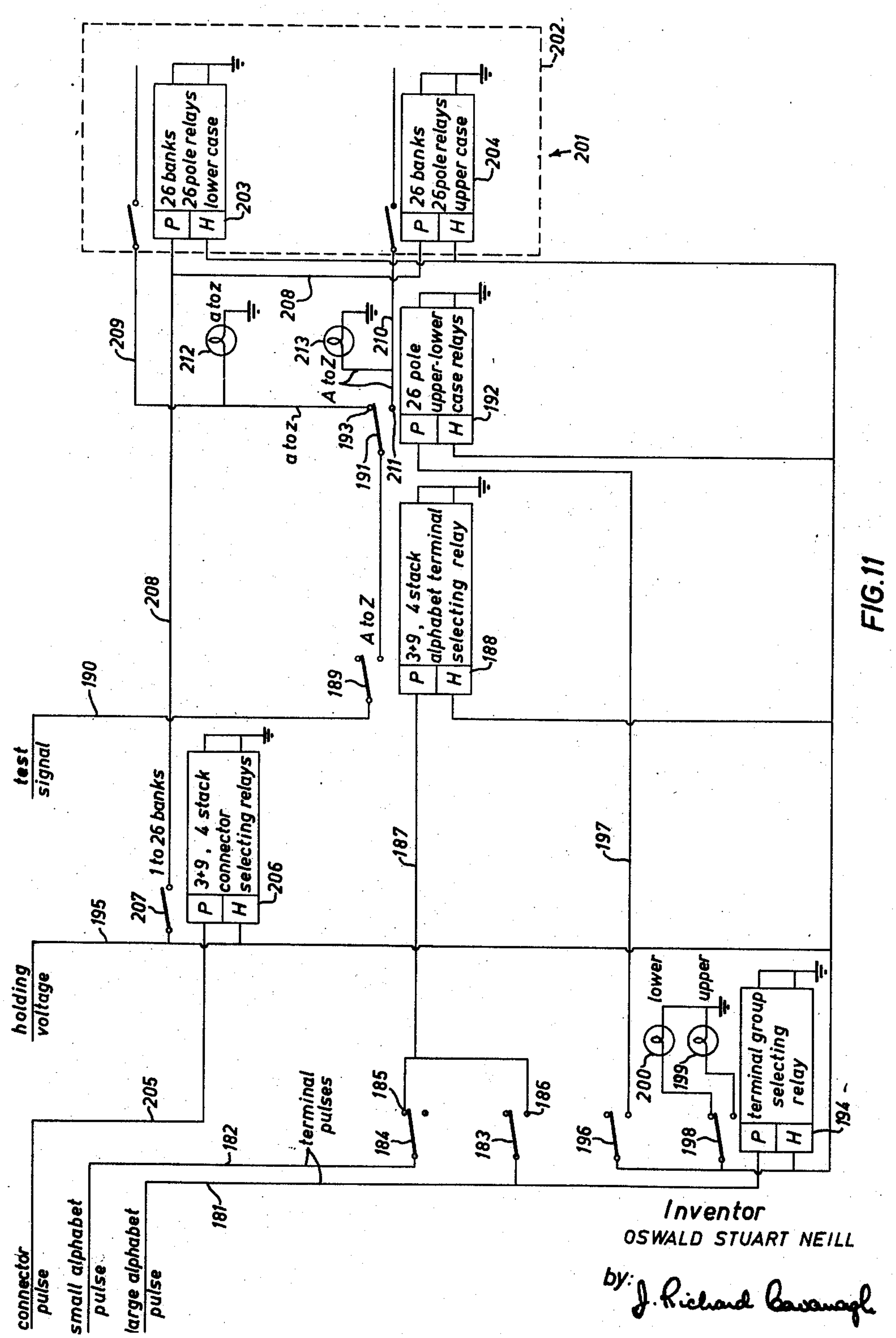
Figure 12:
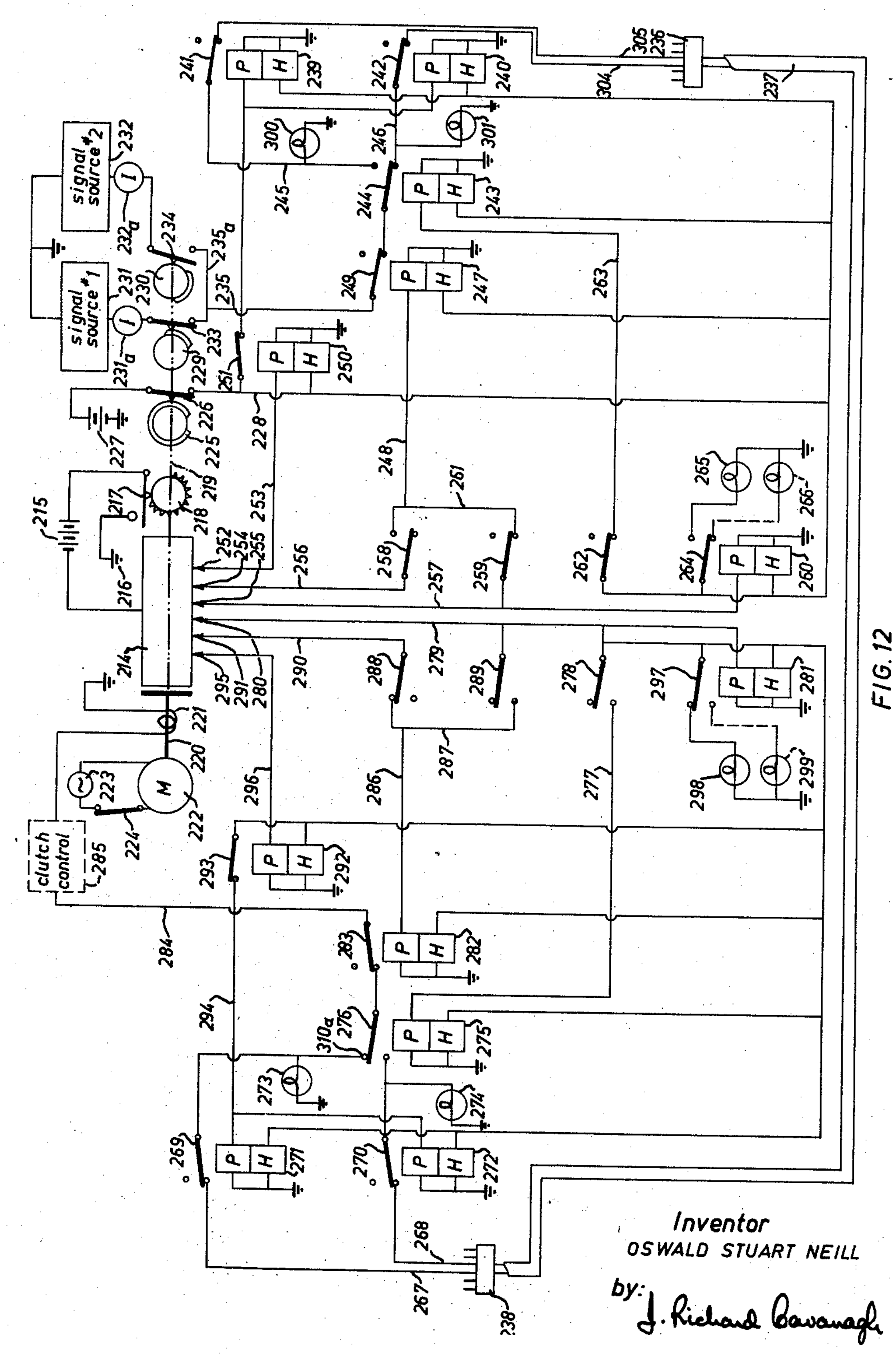
Figure 13:
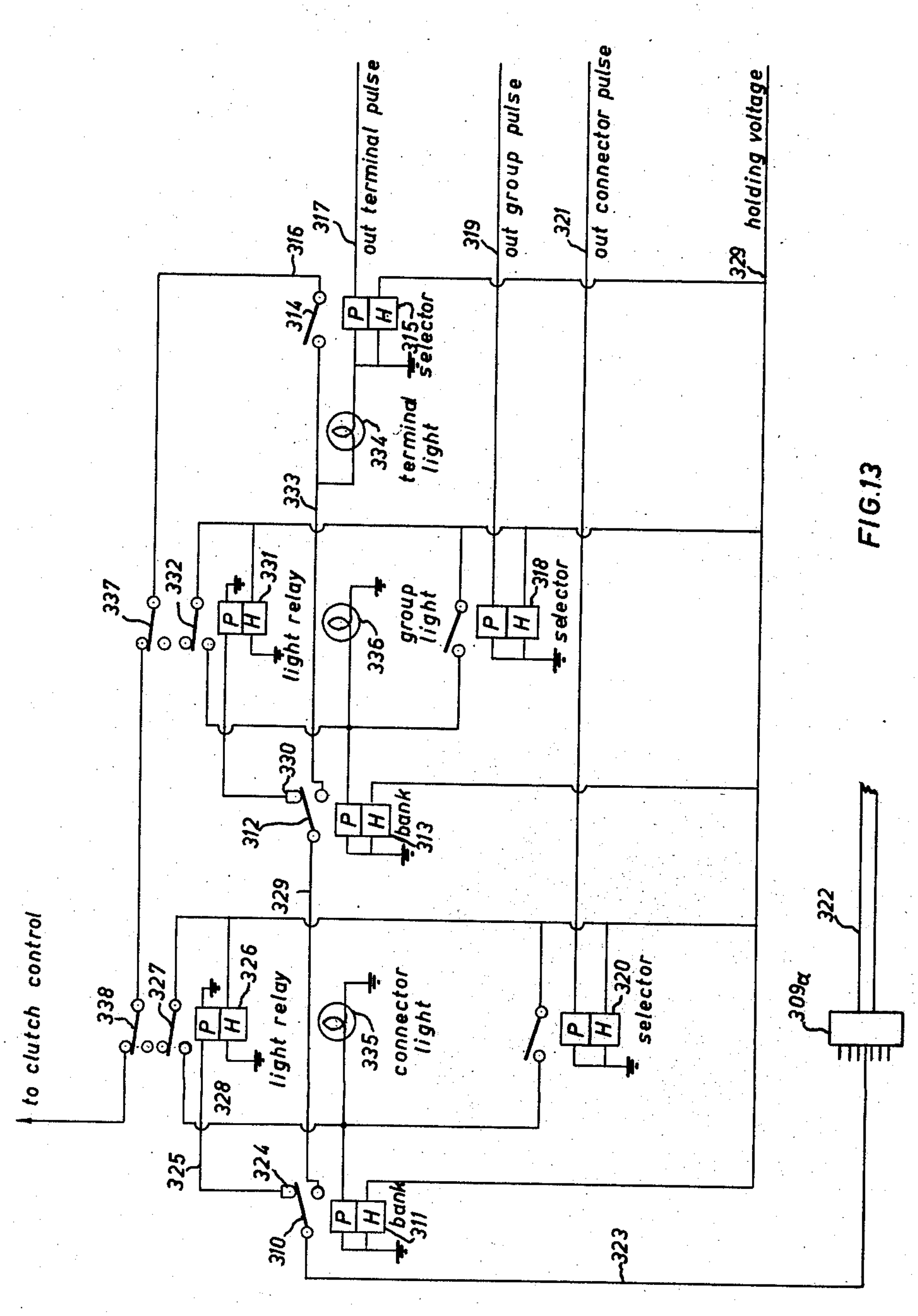

Figure 8 diagrammatically illustrates the modified input circuit for the testing of cables or other multiple connectors adapted to be connected to any one of ten connectors at each end and wherein the connectors contain ten groups of ten terminals;

Figure 9 discloses a form of information carrier card adapted for use with the system disclosed by the diagrammatic illustration of Figure 8;

Figure 10 discloses a modified form of information carrier card having terminal code information arranged thereon to accomplish terminal group selection essentially at the carrier;

Figure 11 discloses a terminal selection system for the input side of testing apparatus of the invention adapted to utilize the information carrier of Figure 10 whereby a selection may be made of a lower case or upper case terminal in any one of twenty-six connectors;

Figure 12 is a complete electrical schematic for testing apparatus of the invention embodying a duplex terminal selecting system serving six connector groups and embodied in the mechanical construction described with reference to Figures 1 and 2;

Figure 13 shows a further modified terminal selecting system for the output circuit of testing apparatus disclosed herein, giving complete fault information; and Figure 14 is a diagrammatic presentation of the elementary components of apparatus of the invention.

The following disclosure made with reference to the accompanying drawings teaches both general and detailed aspects of the invention, particularly as applied to the testing of multiple wire cables. Modifications of the invention are also considered under the various sections, all of which embody the same general concept.

*Section 1.—General concept*

The invention in its more general aspects, concerns the automatic selective and consecutive application of a test signal of direct current or alternating current form to a plurality of electrical conductors or other electrical circuit parts connected to individual input and output connector terminals. Referring first to Figure 14, the test signal source A has a signal voltage $V_t$ connected across the terminal ends of a conductor or electrical circuit part B for the purpose of testing the latter. The conductor B may be connected to any of the terminals C of the connectors D placed selectively in circuit with the source A by the selecting devices E and F for the input and output ends of the conductor respectively. The necessary terminal selection is made by a driven sensing device G which actuates the selecting devices E and F responsive to indexed terminal code information on suitable information carrier means H which may be in the form of a punched card. The sensing device and selecting devices makes the necessary terminal selection for both ends of the conductor B at the same time.

The sensing device G preferably forms a part of the return circuit for the source A so that the sensing device can be rendered inoperative in the event the return circuit is incomplete for any reason, including a failure of the conductor under test. Indicating means (not shown) responsive to test signal, are operatively connected to each terminal to reveal a connection error or failure of the conductor or other fault as hereinafter set forth in more detail.

*Section 2.—Mechanical arrangement*

Figure 1:
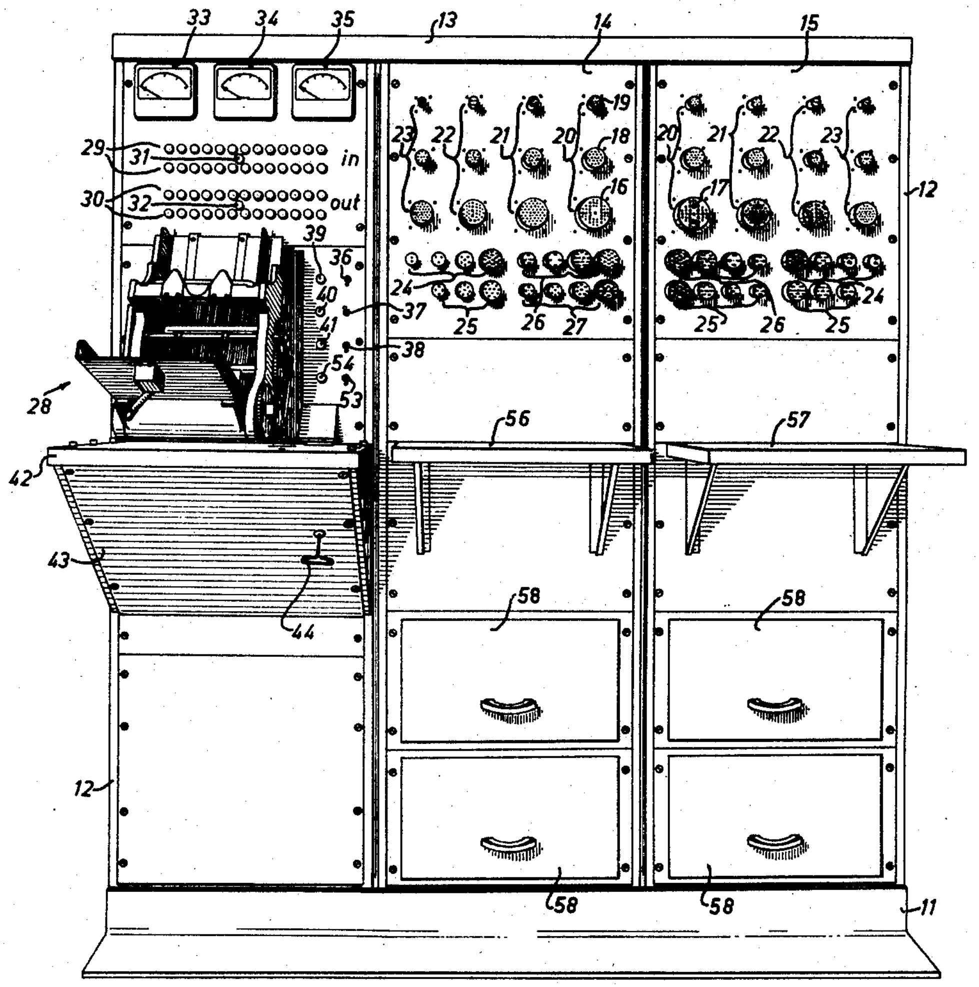
Figure 1 is a front perspective elevation of one preferred design of multiple conductor testing apparatus of the invention.
Figure 2:
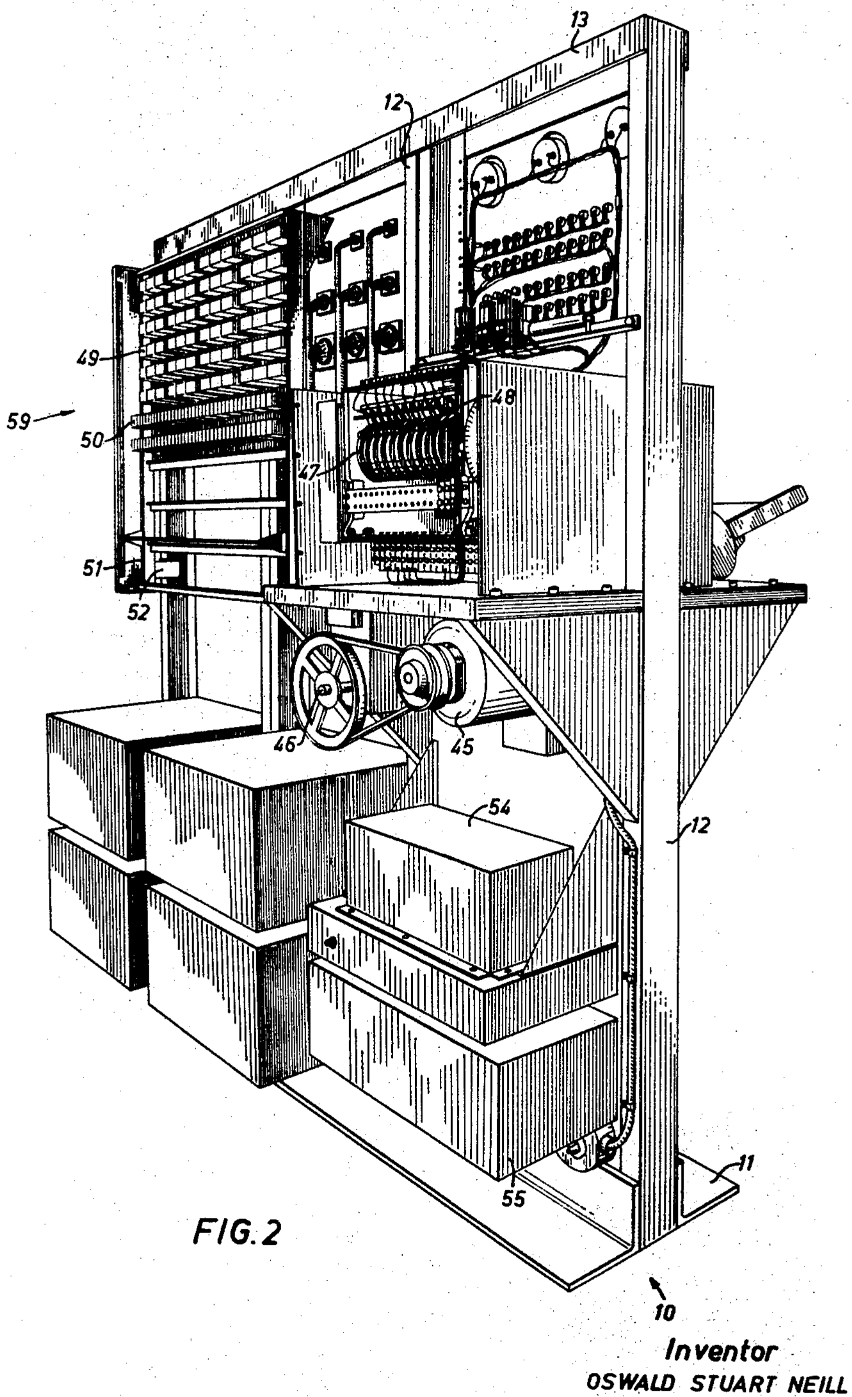
Figure 2 is a rear perspective view of the apparatus of Figure 1.

A preferred mechanical arrangement of testing apparatus of the invention is shown in Figures 1 and 2 for use in testing connecting cables for aircraft instrumentation. The apparatus of the invention may comprise a main frame 10 formed of base angles 11, having supporting posts 12 connected at their top ends by the stringer 13 and adapted to support the functional mechanisms of the apparatus by a panel class of mounting. A plurality of female connectors or terminal socket sets are mounted on the panels 14 and 15. The manner of arranging the terminal sockets within each set is determined by the maximum number of terminals encountered in the largest socket of the set. Thus, the similar style inlet and outlet sockets 16 and 17 on panels 14 and 15 respectively, are adapted to receive the male connectors of a cable. The socket 16, for example, may embody a plurality of terminals of sufficient number that they must be designated by a complete capital letter alphabet and in addition, a portion of a lower case or small letter alphabet, according to conventional design of such sockets. However, the socket 18 may embody only a portion of the upper case alphabet. Likewise, the socket 19 may include only a small portion of the upper case alphabet. All of the common alphabet connections of the sockets 16, 17, 18 and 19 are intended to be connected electrically in parallel in accordance with this invention to define a set or group 20 of sockets of a given style. Each of the panels 14 and 15 carries corresponding groups of sockets designated by group number sets 20, 21, 22, 23, 24, 25, 26 and 27. While the corresponding inlet and outlet sets of sockets are shown mounted on separate panels, they may be placed directly adjacent one another whereby a short cable to be tested may be connected directly to the inlet and outlet female connectors or sockets.

The invention contemplates that an information carrier member identifying a particular terminal of an inlet connector and a particular terminal of an outlet connector, be designated in indexed manner by way of suitable information. A separate carrier designates the desired information for each terminal of the particular cable to be tested. Accordingly, by virtue of the parallel connection of terminals of the connectors in any one group or set, selection need only be made of the set and of a particular terminal in the set of connectors chosen. One way of providing a suitable information carrier for this purpose is to employ a conventional card index means as a carrier, in such manner, however, that a card is provided for each separate terminal desired to be selected for test purposes. Therefore, a plurality of cards indexed by punching or other suitable means, may carry sufficient terminal code information to identify not only the connector group or set to which a connector belongs but also all of the connections made to the connector by a cable to be tested.

One suitable apparatus adapted to select information from punched cards, is generally utilized in well known automatic tabulating machines in which a plurality of cards indexed by punching are fed automatically through a sensing head apparatus adapted to provide electrical impulses, hereinafter referred to as "terminal selecting pulses" responsive to the indexed information. The sensing apparatus 28 is of this conventional type and is adapted to consecutively and rapidly detect information from a plurality of punched cards indexed according to this invention whereby the circuitry and mechanism of this invention as set out in more detail hereinafter and operatively related to said sensing apparatus, effect a consecutive and rapid testing of all of the wires of a cable connected to an inlet and outlet set of connectors. In the event a multiple end cable is to be tested, the plural connectors at one end are plugged by way of adaptors of known design into convenient sockets of different connector groups. Adaptors may also be used to enable the connection of any unmatched end to one of the sockets shown. It will therefore be obvious that adaptors may be provided in any one of a variety of designs and may even be of a terminal board form adapted for the connection of individual wires to a socket by a male plug construction carrying said board.

Indicating means 29 and 30 are provided preferably in the form of lamps wherein a lamp is provided for each alphabet terminal regardless of the style of connector or connector set. The indicating means 29 define a complete alphabet of terminals into a cable and the set of indicating means 30 define a complete alphabet of terminal connections out of the cable being tested. The signal lights 31 and 32 are energized when the alphabet designation is intended to be lower case.

Suitable meters 33, 34 and 35 indicate the amperage to which a test line is being subjected, the electrical continuity of the test line, or the internal electrical resistance of the line being tested and the like, wherein said meters are switched into the appropriate circuitry by switches 36, 37 and 38 as indicated by signal lights 39, 40 and 41. The shelf 42 has an enclosure 43 thereunder carrying an actuating handle 44 by means of which the drive means or the motor 45 and clutch drive mechanism 46 may be released to permit manual adjustment of a series of operation controlling and selecting cams 47 which control the actuation of a series of switches 48 operating responsive to information passing through the sensing apparatus 28 to control terminal selection through the operating relays 49 and 50 supported on the mounting frame 51 swingable on hinges 52 as shown in Figure 2. Manual switch 53 is used for restarting the sensing apparatus for a further one-revolution cycle as hereinafter described in more detail. The power supplies 54 and 55 are utilized for applying test signals to the wire of a cable being tested for the apparatus of the invention.

Convenient shelves 56 and 57 are disposed below the connector panels 14 and 15 to support connecting gear and the like. A plurality of drawers 58 are also provided for the storage of connector adapting devices and supplementary gear.

It will be seen that additional connector panels may also be supported in a continuation of the main frame (not shown) on the left-hand side of the apparatus of Figure 1. The thus provided additional inlet and outlet connector panels would carry a swingable rack of controlling and selecting relays preferably mounted in the manner indicated in rack 59 of Figure 2.

According to the invention, the sensing apparatus is rendered inoperative for the selection of a following information carrier or card in the event of a failure occurring in the particular wire of the cable being tested whereby an indication of the correct alphabetical designation for the input terminal to the cable being tested will be designated but no outlet terminal light will be energized. On the other hand, if the terminal connections for the cable being tested are incorrect, the incorrect connections will be indicated but the sensing apparatus will not continue to select further cards. Furthermore, in the event of a breakdown in the terminal selecting apparatus of the invention, the indicating means will indicate the location of such breakdown in such manner that it can be easily traced while again the operation of the sensing apparatus is automatically stopped. In general, therefore, the apparatus of the invention is provided in such form that it fails safe; that is, it does not continue to operate in the event of failure of any portion of the apparatus.

Figures 3, 4, 5:
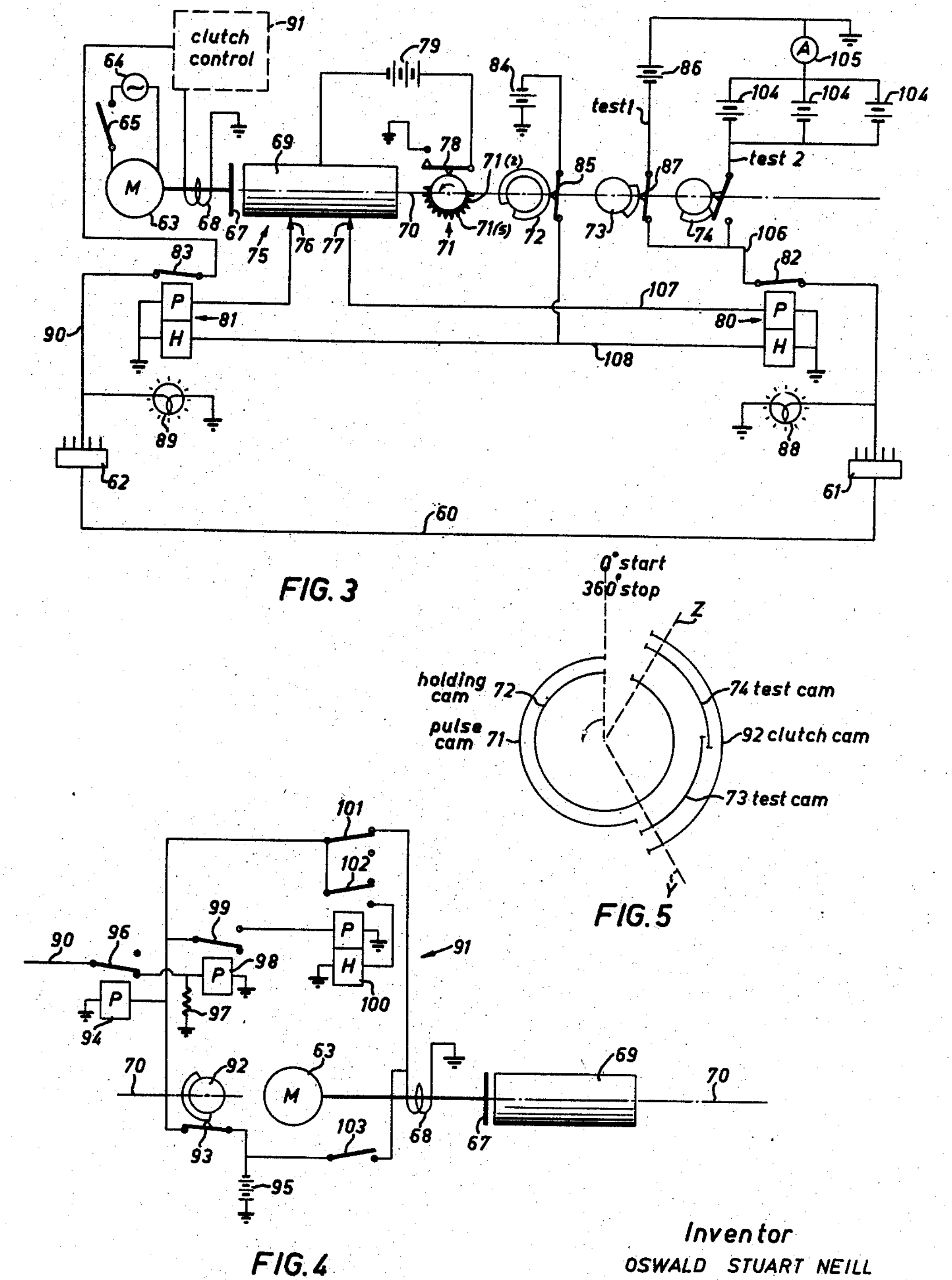
Figure 3 shows a simplified electrical schematic of apparatus of the invention for testing conductors extending between a single input connector and a single output connector.
Figure 4 is an electrical schematic of a clutch control circuit for the apparatus of Figure 3.
Figure 5 is a cam diagram showing the duration of switching action accomplished by the switching cams of Figure 3.

While the apparatus of the invention can be provided in complex form to handle the multiple testing of a great variety of circuitry, it is of great interest to gain an appreciation of the principles involved by considering simplified schematic illustrations as set forth in Figures 3 to 5.

*Section 3.—Elementary circuit*

In Figure 3, an electrical circuit component such as, for example, a single wire 60, terminating at the connectors 61 and 62, has consecutively applied thereto a continuity test signal and a current carrying capacity test signal. An electric motor 63 driven by an electrical current source 64 upon closure of switch 65, drives a normally disengaged one-revolution magnetically actuated clutch 67 of conventional construction energized by solenoid 68 for one revolution rotation of the conducting cylinder 69 shown in operatively related driven connection by common operative line 70 with the pulse cam 71, holding cam 72 and test actuating cams 73 and 74. The driving of an electrically conducting cylinder in association with a plurality of operatively related controlling cams is well known and forms a part of the conventional sensing apparatus 75 and does not, therefore, form a part of this invention alone but only in combination with terminal selecting means and associated testing means as hereinafter set forth in more detail.

The conducting cylinder 69, upon selection of an information carrier card (not shown), is adapted to conduct a pulse of electrical energy to sensing brushes 76 and 77 when indexed openings on such card travelling about the cylinder 69 fall into registry therewith whereby the brushes contact the cylinder.

A pulse of electrical energy is conducted by the cylinder to the brushes 76 and 77 after contact of the latter with the cylinder 69 and before disengagement therefrom. Terminal selection is provided by pulse cam 71, actuating switch 78, closing the circuit of battery or other electrical sources 79 to cylinder 69 to provide a predetermined number of indexed terminal selecting pulses of electrical energy (twelve pulses in the present example) during each revolution of the cylinder. Assuming that one of the pulses is adapted to make a complete electrical circuit through the sensing brushes 76 and 77 upon registry of the carrier therewith, the power coils P of relays 80 and 81 effect closure of the normally open relay switch arms 82 and 83 respectively. Each of the relays 80 and 81 embodies a holding coil H energized by a battery or other suitable source of holding voltage 84 in series with the cam switch 85 actuated by the holding cam 72. Note that the holding cam 72 is adapted to hold the cam switch 85 in the closed position through a large arc of movement of the contact roller or cylinder 69. Accordingly, though a momentary pulse is required to effect closure of the relay switches 82 and 83, the holding voltage or signal from the source 84 maintains switches 82 and 83 closed for a period during which test voltages may be applied to the wire 60.

The cam diagram shown in Figure 5 illustrates the zero index starting point of the cams accompanied by corresponding motion of the indexed carrier (not shown) about cylinder 69 wherein the holding cam 72 is effective in maintaining the cam switch 85 closed to supply a holding voltage from source 84 for substantially a complete cycle or revolution of all of the cams and of the cylinder 69. The pulse cam 71 provides a plurality of pulses by actuation of switch 78 over a portion of the complete cycle arc of 360 degrees. Thus, assuming that a carrier card is adapted to carry a series of vertically indexed openings thereon at predetermined spacing, the pulse cam will be adapted to provide a corresponding number of pulses at the same indexing and spacing but over a portion only of a complete cycle or revolution of the cylinder 69 and cam.

In the example shown in Figures 3 to 5, the pulse cam 71 may provide twelve pulses over an arc of say two hundred degrees. A number of test circuits may be consecutively applied to a selected wire 60 to be tested after the selection of the latter by the pulse cam and before one revolution has been completed; that is, between a point of two hundred degrees of revolution and three hundred and sixty degrees of revolution of the cams and cylinder 69. Figure 5 illustrates the use of two test cams which may include the test cams 73 and 74 adapted to act consecutively with a slight overlap or if not an overlap, adapted to cause the test circuits to be applied without interruption of continuity of test signals being applied to the test wire 60.

In operation, the holding cam closing switch 85 energizes the holding coils H of the relays 80 and 81 upon a pulse being applied to the latter as described, whereby the relay switches 82 and 83 are held in the closed position for substantially the remainder of the complete cycle of revolution of the cylinder 69 and the cams. A first test signal from source 86 passes through the test cam switch 87 through relay switch 82 to energize the indicating lamp 88 at the input connector 61 and if the line 60 possesses continuity, the signal makes circuit through the output connector 62 to the terminal indicating lamp 89. The return line 90 is adapted to carry the test signal through the closed relay switch 83 to the clutch control device 91 governing operation of the magnetic clutch actuating device or solenoid coil 68 responsive to continuity in the line 60 for the particular test signal.

*Section 4.—Clutch control device*

The clutch control device 91 is shown schematically in Figure 4 and comprises a clutch cam 92 adapted to close the clutch switch 93 controlling energization of the actuating coil or solenoid 68 operating clutch 67 and driven by motor 63. The cam action of cam 92 effects closure of the switch 93 momentarily after the closure of the first test switch 87 by the first test cam 73. The cycle of operation for Figures 3 and 4 is shown at the point indicated by the dotted line Y. Accordingly, relay 94 will be energized by the clutch energizing source 95 upon closure of switch 93 whereby relay switch 96 will be drawn to the closed position illustrated, at which the test signal entering through return line 90 and relay switch 83 will be connected through the load resistor 97 to ground. The relay 98 in parallel with resistor 97 will be energized to open the normally closed relay switch 99 opening the electrical circuit of control relay 100 to source 95. Assuming that a test signal is available from the return line 90 and therefore assuming that there is continuity in the test line 60, the control relay 100 will be de-energized and therefore the control relay switches 101 and 102 will maintain their normally upward position at which switch 101 completes the electrical circuit of the clutch solenoid 68 by source 95 for the remainder of the complete cycle of revolution of the cylinder 69 and clutch cam 92 as shown in Figure 5 unless the control relay is energized before the completion of such cycle.

The control relay 100 can be energized only if relay 98 becomes de-energized by reason of a lack of test signal voltage in the return line 90. Thus, in the event of lack of continuity in the test line 60, the relay switch 99 of relay 98 will be disposed in the normal upward position energizing relay 100 by source 95 whereby control relay switches 101 and 102 will be drawn downwardly opening the circuit of the solenoid 68 and maintaining the relay 100 in the energized condition by reason of the energization of the holding coil H thereof through control relay switch 102 until the clutch control cam 92 opens the circuit of solenoid 68 with source 95 substantially at the end of a cycle as shown in Figure 5.

If the circuit of the solenoid 68 should be opened during any of the consecutive tests applied, the solenoid circuit will be held open by the holding coil H of control relay 100 to the completion of the cycle of revolution of the cams and contact cylinder 69 whereby the one-revolution automatically releasing clutch 67 will be released from drive relation with the contact cylinder 69, thus stopping further operation of apparatus of the invention until the manual switch 103 is closed by the operator to begin a further cycle of operations.

From the foregoing, it will be appreciated that a plurality of indexing pulses are provided by the pulse cam 71 during a portion of one cycle and that a plurality of test signals are provided consecutively substantially throughout the remainder of such cycle. A holding cam effectively retains the information obtained by operation of the pulse cam substantially throughout the cycle and the clutch cam maintains a condition for actuation of the clutch to continue a further operation unless prevented from so doing by failure of a test, the clutch cam being active during the consecutive action of the test cams respectively, to the end of the cycle.

In operation, a series of tests may be applied to wire 60 in a consecutive and rapid manner. Thus, source 86 may supply a low current continuity voltage and test sources 104 in parallel may supply a high current voltage or test signal through ammeter 105 to test current carrying capacity of soldered connections and the like. The tests shown are by way of example only, it being obvious to skilled persons that a variety of test signals may be supplied from suitable signal sources in the same general manner as set forth herein having regard to the usual techniques of handling high voltage signals, high frequency signals or special test signals which may require the isolation of the direct circuitry shown therefrom by signal responsive means.

*Section 5.—Terminal selection*

Operation has been discussed for the testing of a selected wire 60 being one wire of a large number which may extend between the connectors 61 and 62. If it is desired to consecutively test a cable extending between these connectors and comprised of a plurality of wires, then a selection of terminals at both ends must be provided for.

Figures 6, 7:
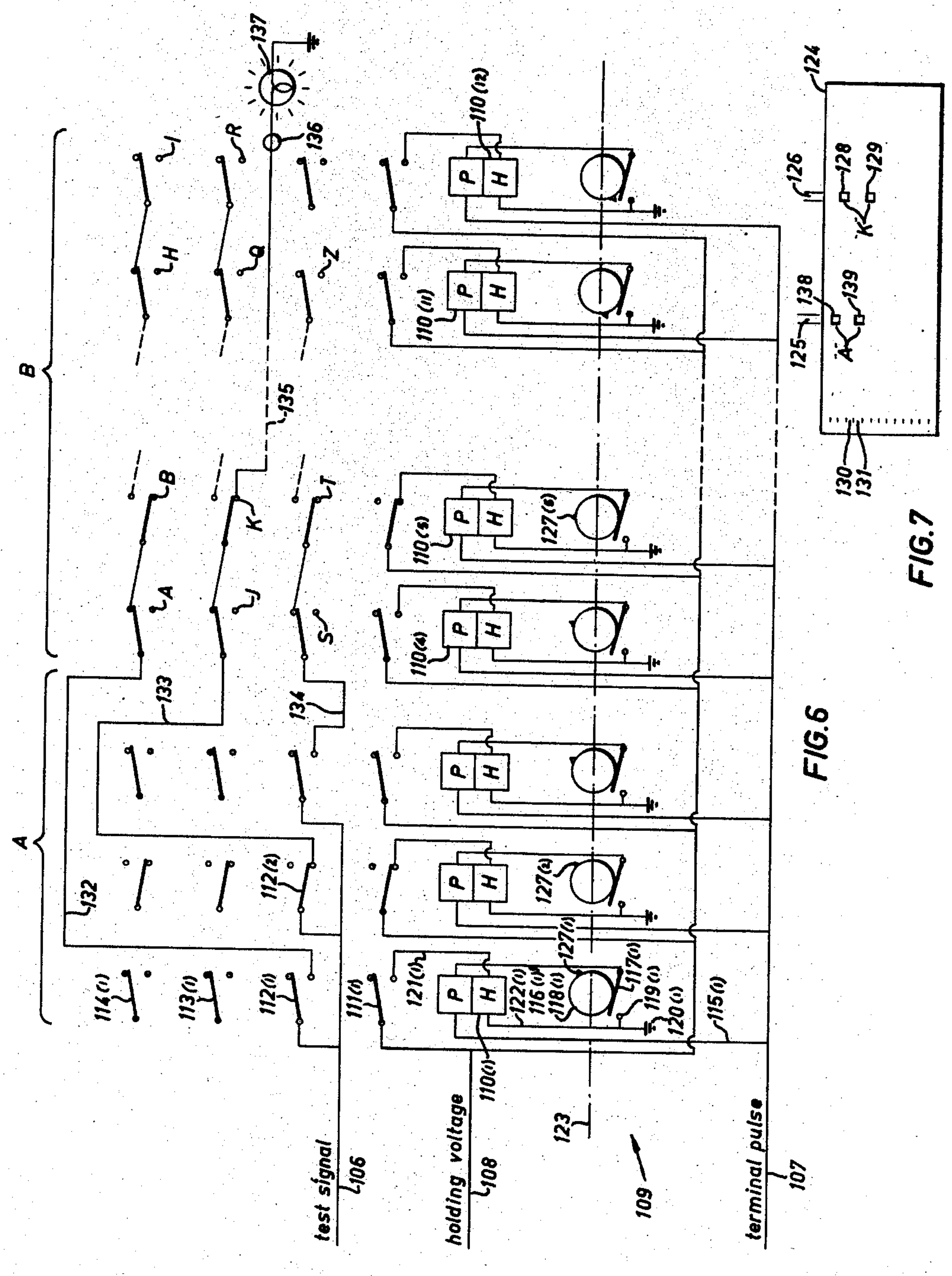
Figure 6 shows a terminal selecting switch device in schematic form hereinafter referred to also as a selector or a selecting device and utilizable for terminal selection or terminal group selection or connector selection according to selecting pulses applied thereto.
Figure 7 is a view of a typical information carrier of card form having terminal code information thereon.

If the relays 80 and 81 of Figure 3 are each assumed to be replaced by a complete set of terminal selecting relays as shown in Figure 6, then each carrier card will index the selection of a particular terminal at the input connector 61 as well as the output connector 62. Thus, a test signal from line 106, an indexing terminal selecting pulse from line 107 and a holding voltage from line 108 of the circuit of Figure 3, may be applied to terminal selecting means 109, for example, of the form shown in Figure 6 wherein such means comprise twelve quadruple stack relays $\mathbf{110}_{(1)}$ to $\mathbf{110}_{(12)}$, each having a holding coil H, a pulse coil P and form relay switches 111, 112, 113 and 114 identified by subscripts $_{(1)}$ to $_{(12)}$.

The selection of terminal K is shown by way of example in Figure 6 wherein the connections for all connector terminals are made to individual relay switches of nine relays $\mathbf{110}_{(4)}$ to $\mathbf{110}_{(12)}$ in group B among the upper three relay switches of each quadruple switch stack. Thus, switch terminal A of the first relay $\mathbf{110}_{(4)}$ of the nine relays of group B is adapted to be connected to a terminal A of a connector. Note that the relay switches 112, 113 and 114 in the de-energized normally upward position, are connected electrically in series each with the next following like switch to provide three series groups A to I on switches 114, J to R on switches 113 and S to Z plus an unused switch on switches $\mathbf{112}_{(4}$ to $_{12)}$. When not energized, a complete circuit may be made from the relay switch $\mathbf{114}_{(4)}$ to the switch arm $\mathbf{114}_{(12)}$ and likewise from relay switch arms $\mathbf{113}_{(4)}$ and $\mathbf{112}_{(4)}$ to relay switch arms $\mathbf{113}_{(2)}$ and $\mathbf{112}_{(12)}$.

A typical operating connection of any of the twelve relays is illustrated by the first relay $\mathbf{110}_{(1)}$ wherein the power or pulse coil P is connected by line 115 to the line 107 carrying terminal selecting pulses thereto and completes its circuit through line 116 and cam switch 117 operated by cam 118 to switch contact 119 grounded as at 120. Assuming, therefore, that the cam 118 is adapted for closure of cam switch 117 in synchronization with an indexed pulse in line 107, the pulse coil P will be energized, thereby closing the four relay switches $\mathbf{111}_{(1)}$, $\mathbf{112}_{(1)}$, $\mathbf{113}_{(1)}$ and $\mathbf{114}_{(1)}$. A holding voltage applied through line 108 and energizing the holding coil H through line 121 upon closure of relay switch $\mathbf{111}_{(1)}$ as pulse coil P is energized, makes circuit through line 122 to ground at point 120 whereby relay switch arms $\mathbf{111}_{(1)}$ to $\mathbf{114}_{(1)}$ are maintained in the closed position until the holding coil circuit is broken such as by the holding cam 72 releasing holding cam switch 85 (Figure 3).

The several relays shown in Figure 6 are controlled in their operation by the individual cams $\mathbf{118}_{(1)}$ to $\mathbf{118}_{(12)}$ operatively related by suitable means 123 synchronized with or directly driven by the cam shaft represented by the common drive line 70 of Figure 3.

In the selecting device or selector type shown, it is necessary to provide two indexing pulses to enable selection of a single terminal from a complete alphabet of terminals. An information carrier of suitable form is shown in Figure 7 and is designated by numeral 124 wherein two spaced apart vertical index rows 125 and 126 are adapted to register with sensing brushes such as brushes 76 and 77 of Figure 3 when the carrier card 124 passes about the cylinder 69. The selecting cams $\mathbf{118}_{(1)}$ to $\mathbf{118}_{(12)}$ are adapted to provide twelve consecutive pulses equally spaced over a total arc corresponding to the active pulsing arc of motion of the pulse cam 71. Each of the selecting cams carries one pulse point 127 corresponding to a pulse point on the pulse cam. Therefore, the second pulse point $\mathbf{71}_{(2)}$ on pulse cam 71 will provide a pulse signal by reason of the indexed information opening 128 on the carrier card 124 while at the same moment, the point $\mathbf{127}_{(2)}$ on selecting cam $\mathbf{118}_{(2)}$ will effect closure of cam switch $\mathbf{117}_{(2)}$ energizing pulse coil P of relay $\mathbf{110}_{(2)}$ effecting closure of relay switch $\mathbf{111}_{(2)}$ whereby the holding coil H of relay $\mathbf{110}_{(2)}$ will retain the relay switches $\mathbf{111}_{(2)}$, $\mathbf{112}_{(2)}$, $\mathbf{113}_{(2)}$, $\mathbf{114}_{(2)}$ in the closed position for the remainder of the cycle of the holding cam 72. A second information opening 129 is provided in column 126 of the carrier card 124 and is spaced two index spaces 130 and 131 from the opening 128. A second pulse is thereby provided upon indexing of opening 129 with a point $\mathbf{71}_{(5)}$ on pulse cam 71 while at the same moment, pulse cam $\mathbf{118}_{(5)}$ is in a position effecting closure of cam switch $\mathbf{117}_{(5)}$. The quadruple stack of relay switches $\mathbf{111}_{(5)}$, $\mathbf{112}_{(5)}$, $\mathbf{113}_{(5)}$, $\mathbf{114}_{(5)}$ are therefore drawn downwardly and maintained in such position by energization of the holding coil H of relay $\mathbf{110}_{(5)}$ in the manner before described.

A terminal selection having been accomplished, test signals may be communicated to the selected terminal from line 106 connected to relay switches $\mathbf{111}_{(1)}$, $\mathbf{111}_{(2)}$, $\mathbf{111}_{(3)}$ in turn connecting to the three groups of series connected relay switches $\mathbf{114}_{(4)}$ to $\mathbf{114}_{(12)}$, $\mathbf{113}_{(4)}$ to $\mathbf{113}_{(12)}$, and $\mathbf{112}_{(4)}$ to $\mathbf{112}_{(12)}$ respectively, by the lines 132, 133 and 134. In the present example, the closure of switch $\mathbf{112}_{(2)}$ passes the signal through line 133 to the relay switch series $\mathbf{113}_{(4)}$ to $\mathbf{113}_{(12)}$ for terminals A to I, which series is interrupted at the relay switch $\mathbf{113}_{(5)}$ to route the test signal to terminal K upon energization of relay $\mathbf{110}_{(5)}$ as described. Each of the alphabet designated terminals of the relay switches is connected to a corresponding terminal of a connector. Thus, the energized terminal K of relay switch $\mathbf{110}_{(5)}$ is connected by line 135 to a connector terminal 136 by which, means indicating the selection made such as signal light 137 is energized. The showing of connecting lines between the remaining alphabetically designated relay switch contacts and the other connector terminals, has been eliminated to retain simplicity of presentation.

The above description of the selecting means relates to the input circuit for the input connector 61 of Figure 3. It should also be appreciated that similar selecting means may be provided for the output terminals of the output conector 62, which selecting means would generally correspond to the output selecting relays 81 of that figure. It is obvious that the output terminal may be located in a different position on the output connector 62 and may carry a different alphabetical designation. Thus, in Figure 7, the indexing column 125 may carry a first information opening 138 located to energize the first selecting relay of the selecting series. Again referring to Figure 6 for the sake of convenience, the first relay $110_{(1)}$ of the output terminal selecting device will be energized by the indexed information opening 138 following which the first relay $110_{(4)}$ of the group B will be energized by the indexed information opening 139 whereby relay switch $114_{(4)}$ will be closed to make circuit to terminal A at the output connector.

*Section 6.—Single connector single group system*

The system disclosed in Figure 3, when embodying a terminal selecting device for each of the input and output connectors as above described, is adapted to select one terminal from a single alphabet group of terminals for testing apparatus of the invention serving connectors which are all of the same type and wherein the cable being tested emerges to no more than one male connector at each end.

In operation, if the cable wiring is incorrect to the input connector, then the signal light actuated by the input terminal selecting device will be illuminated whereas the signal light selected by the output selecting device will not be energized by test signal required to pass through the cable being tested to the selected output terminal. For example, by way of adherence to the above description, if the terminal K is selected at the input end, then the K light will be illuminated at the input end, but the alphabet light at the output end will not be illuminated in the event there is a lack of continuity in the line being tested or a faulty connection at either the input or output connector. In both cases, the clutch control circuit will be actuated as before described whereby, in the absence of return test signal voltage, the apparatus will not proceed in a further cycle of operation until the manual switch 103 is closed (Figure 4). If, however, a faulty connection exists at the outlet connector and there exists both continuity in the tested line and a correct connection at the input connector, then the terminal light connected to the terminal to which the wrong connection is made at the outlet connector will be illuminated, thereby designating the location of the wrong connection. This indication will be accompanied by stoppage of the apparatus at the end of its cycle for failure of signal voltage to pass through the output terminal selecting device by way of an unselected terminal to the clutch control. In the event the line, wire or circuit being subjected to test, fails under the test signal, then a lack of continuity results in this line, circuit or wire and the apparatus will again fail to continue a further cycle of operations unless manual switch 103 is closed.

Accordingly, a machine stoppage is accompanied by an indication of the locale of the fault. A service card may be attached to the cable being tested upon which may be recorded information concerning the faults found during the test and listing terminals from which the faults may be traced. If no faults arise in the programming of a cable through the apparatus of the invention during which a series of information carriers are sensed consecutively by the sensing brushes as described, then the apparatus will programme a complete series of test cycles for a complete cable without interruption.

The apparatus of the invention may be tested before use by connecting a test cable containing an individual line for each of the terminals. A series of information carrier cards for such cable is passed through the apparatus to programme the cable. Failure of continuity will then be a lack of continuity in the apparatus itself. However, the apparatus of the invention will not continue a further cycle of operations even though a lack of continuity occurs in the apparatus itself. By this means, the circuit of the apparatus can be traced for servicing. If a lack of continuity to a selected terminal occurs in the input circuit of the apparatus, then the latter will stop and no signal lights will be illuminated. The circuit failure can be quickly found by tracing the particular terminal circuit at the input side.

On the other hand, if the lack of continuity occurs beyond the signal light in the output circuit, then both signal lights will be illuminated but the machine will stop for the output circuit is operative for further programming only by passing the test signal therethrough to the clutch control. It will therefore be apparent that the apparatus can be utilized in a manner which is self-proving. Thus, by programming a series of test information cards at regular intervals with a proved test cable connected, lost testing time can be avoided due to failures in the apparatus itself. Even though a breakdown may occur during testing procedures, the apparatus will not continue a further cycle of operation until the failure is detected and rectified.

The simplified form of apparatus above discussed entails certain essentials relative to the selection of a terminal for testing. It will be observed that it is necessary to provide a terminal selecting pulse. In the present example, any one of twenty-six terminals may be selected by the selecting means described. Terminal selection must be made both at the input and output end because the terminal to be called for at the output end may be different from the terminal to be called for at the input end.

It may be desired to provide a plurality of connector styles in groups or sets and to make a selection between such connectors or groups of connectors. Multiple groups of terminals may be provided in one or more connectors of any connector group. A selection of connectors, i.e., connector groups, may be made by providing connector selecting pulses indexed from the same information carrier as that carrying the terminal selecting pulses. Also, if multiple groups of terminals are provided in each of the connectors, for example, if a number of alphabets of terminals are provided in each connector, then one of a number of alphabets may be selected by providing terminal group pulses derived from a group pulse column of the same information carrier card.

The selecting pulses, whether they be terminal pulses, group pulses or connector pulses, may be programmed through a selecting device of the form shown in Figure 6 and all of the selectors may be actuated by the same series of cams 118. A simplified system of this general type is shown in Figure 8.

*Section 7.—Multiple connector multiple group system*

A diagrammatic outline of a system comprising a number of connectors, each containing a number of groups of terminals, is shown in Figure 8 wherein the selection of one terminal out of a thousand is shown. The terminals are divided among ten connectors each of which contains ten groups of ten terminals.

A suitable test signal from line 140 is programmed according to a terminal pulse from line 141 actuating a terminal selector 142 adapted to distribute the test signal through relay switches 143 thereof to a selected terminal line 144. Since it is desired to distribute the selected terminal to one of ten groups of ten terminals, a group selector 145 energized from the group pulse line 146 distributes holding voltage from line 147 through the selecting relay switches 148 thereof to one bank of relays among ten banks of relays wherein each relay bank comprises ten terminal switches adapted to be closed in unison. The terminal group bank 149, when energized, effects closure of ten individual terminal connections therein, each of which connects a terminal 144 through a group bank relay switch 150 to the lines 151. The lines 151, in turn, must proceed to each connector.

A selection of one connector out of ten is made by providing a connector pulse in line 152 for actuation of connector selector 153 thereby selectively distributing holding voltage through the selecting relay switches 154 thereof to a particular bank of connector relays 155 serving all the terminals for the selected connector. In this example, each bank of connector relays 155 will comprise one hundred relay switches adapted to be closed upon energization of a selected relay bank as determined by the connector selector 153 to thus effect closure of connector bank relay switches 156 to which the lines 151 are individually connected to place one of the latter in circuit connection with its terminal line 157 of a selected connector. Ten lines 144 connect each terminal selecting switch 143 to a relay switch 150 of each of the ten group relay banks 149. Also, ten lines 151 connect each of the one hundred group relay switches 150 to a relay switch 156 of each of the ten connector relay banks 155.

The terminal light 158 for each selected terminal of the terminal selector 142 will be energized by the test signal to indicate the selected terminals. Also, group lights 159 are provided for each outlet terminal of the group selector 149 to designate the selected group. Likewise, connector lights 160 are energized by the output of the selector 155 to designate the connector selected.

If desired, one thousand indicating lights may be employed for all of the input connectors and an additional one thousand lights utilized for all of the output connectors by means of which all errors and faults can be traced as outlined in this description with reference to Figure 3. However, the selecting indicators, that is, the terminal lights 158, group lights 159 and connector lights 160 as shown in Figure 8, enable the use of a lesser number of indicating lights. For example, when utilizing the arrangement of Figure 8 in a return circuit for the outlet connector, return connector lights 161 and return group lights 162 are additionally employed and are adapted to be actuated by return signal voltage coming through the open relay switches 156 and 150 being connected to the open terminals 163 and 164 respectively thereof when in the unenergized position. The terminals 164 and 163 connect to all such terminals of each group or connector bank so that any return voltage coming into a deenergized bank will energize the return group or connector light thereof.

If a connection is made to the wrong outlet connector, then the test signal will energize the return connector light 161 thereof and the testing apparatus will not continue a further cycle of operations until the manual actuating switch is closed as before described. This condition could not occur unless the outlet end of the circuit or cable being tested embodied more than one connector; in which case, the complete programming of the cable connections which will necessarily include the programming of the additional outlet connector, will confirm the error arising in the connector indicated. Assuming that the additional connector contains, for example, two errors, the cross-referencing of the errors as between the two connectors involved, will enable a ready determination of the particular error in each case.

If connector connection is correct and the selected connector bank switches 156 are closed so that the line 151 in the return circuit carries return voltage but an incorrect connection has been made to the wrong group of terminals, then the return group light 162 will indicate the group to which an incorrect connection has been made. Again, the programming of the remainder of the connectors will bring out cross reference information on the error arising in this group enabling a ready determination of the particular terminal. Where the only error is in terminal connection, the terminal light 158 will identify the wrong connection and the machine will stop. If, however, the connection is made to the correct terminal in the correct group of the correct connector, then the correct terminal light 158 will be energized and the return voltage will pass through the return terminal selector 142 to the clutch control device (not shown).

It remains to point out that in the event of a faulty connection to the wrong group or the wrong connector of the inlet connector, then the terminal lights 158, group light 159 and connector light 160 will show but the machine will stop. Moreover, the return connector light 161 will not show because in such event there will be no return voltage. Cross-referencing by completing the programming of the remaining terminals of the connector will enable the ready determination of the faults.

A suitable information carrier for the system of Figure 8 is shown in Figure 9 and comprises a card 165 containing ten internal spaces 166 of latitude in which indexing columns 167 and 168 may be perforated to index terminal selection; columns 169 and 170 may be perforated for group selections and columns 171 and 172 may be perforated for connector selection. Where the card contains ten internal spaces of latitude in depth as shown, the terminal maximum information which could be indexed for any one group would be limited by the capacity of the selecting mechanism associated therewith. Likewise, the maximum information selectable by the selecting mechanism may be limited by the capacity of the information carrier. In the ideal case, each is matched to the other and operates up to capacity. For example, in the structure of Figure 6 adapted to operate with a card having twelve internal spaces, it is convenient to employ twelve selecting relays grouped in a three and nine arrangement. There are an infinite number of selecting relay arrangements which can be employed with a given card index capacity. In the example of Figure 9, it could be assumed that a single opening or pulse is provided by each of the index rows for which the selecting mechanism would comprise ten consecutively actuated relay banks adapted to consecutively close a series circuit but wherein each of the relays may represent a terminal.

The information on the carrier card of Figure 9 may be multiplexed by employing two pulse signals from a given index row in which case the selecting device or selector actuated thereby would be multiplexed appropriately such as by multiplex grouping of the kind taught in the arrangement of Figure 6. Further multiplexing may be provided by adding a further indexing row in each case. Thus, for example, the number of terminals served could be doubled by adding two further terminal indexing rows spaced from the indexing rows 167 and 168 as will be set forth hereinafter in more detail.

A multiplex digital selection has been illustrated in Figure 8 for the purpose of emphasizing that no restriction is intended in this specification with respect to the specific type of selecting device employed. A selection may be made of one unit in ten by any one of a number of well known devices. Thus, for example, dial selecting switch mechanisms employed in conventional telephone circuitry sometimes referred to as step switches, find ready application as selecting devices in the instant invention; also, conventional rotary armature selecting switch devices or known electronic selecting circuitry may be employed.

The provision of selecting devices and the multiplexing of selecting devices as set forth herein does not, in the broad sense, form a part of this invention as such devices are known. However, the specific selection of a terminal from terminal arrays arranged in multiple groups in a plurality of connectors whereby provision is made for the testing of circuitry by way of programming functions utilizing information carrier means, is inherent in the concept of the present invention and may be accomplished in a variety of forms.

Where the terminal groups are provided in multiple alphabets, a simplified design may be provided if the number of alphabets is restricted to two and designated by upper and lower case alphabets respectively.

*Section 8.—Duplex terminal system*

An information carrier card 173 having twelve internal spaces 174 is again shown in Figure 10 wherein the columns or rows 175 and 176 carry alphabetical terminal selection information for outlet and inlet connectors. Assuming it is desired to programme fifty-two terminals, these may be arranged for designation as upper and lower case alphabet terminals. The information columns 175 and 176 are used for terminal selection for upper case letters and the columns 177 and 178 are used for lower case lower terminal seelction. Columns 179 and 180 are used for the selection of connectors.

No special provision is made for the selection of terminal groups; that is, upper or lower case alphabet terminal groups, as the selection is made directly on the information carrier. The information carrier itself, in conjunction with the sensing brushes adapted to be actuated thereby, may therefore function as a selecting device. It is thus intended that a selecting device may comprise either a separate selecting means such as the mechanism set forth in Figure 6 or equivalent, or an information carrier having multiple information columns of the same kind. Means for selecting the groups of connectors or terminals may be provided either as a separate selecting mechanism or by way of multiplex information on the information carrier, in which latter case, an information column would be provided for each selection to be made in a group. Thus, in the present instance, where a choice is made between two terminal groups for both the input connector and output connector, the group selection is essentially made on the information carrier.

Figure 11 is a schematic layout of a terminal selecting system operative by an information carrier of the type shown in Figure 10. In Figure 11, the large or small alphabet terminal pulses from sensing brush lines 181 and 182 proceed through the relay switches 183 and 184 to the ganged terminals 185 and 186 delivering the terminal pulse through line 187 to a terminal selecting mechanism 188 of a form identical to that of Figure 6 having relay switches 189 delivering a selection from a number of terminals designated A to Z. The test signal from line 190 connecting to a source of test voltage (not shown) is distributed by the selecting device 188 to a plurality of double acting relay switches 191, one for each terminal and adapted to be energized by the terminal group relay 192. In the de-energized position, all of the terminal relay switches 191 connect individually to the relay terminals 193 adapted to serve the lower case terminal group *a* to *z* in twenty-six connectors, wherein each connector contains fifty-two terminals designated by upper and lower case letters.

The relay bank 192 is energized by a large alphabet pulse from line 181 energizing the terminal group selecting relay 194 causing holding voltage from the line 195 to pass through relay switch 196 energizing line 197 from the relay 192. Relay switch 198, in its energized position, energizes the indicating light 199 adapted to designate selection of the upper case alphabet group of terminals whereas in the de-energized position, the signal light 200 will designate the selection of the lower case alphabet group of terminals.

A connector 201 is intended to be designated by the chain lines 202. It will be observed that each connector 201 is served by a bank of twenty-six pole relays adapted when energized to simultaneously close a full alphabet of relay switches serving twenty-six terminals. Each twenty-six pole relay connector bank operates twenty-six individual switch elements for a terminal group and accordingly one twenty-six pole relay or bank is provided for the lower case terminal group and another twenty-six pole relay is provided for the upper case terminal group for each connector, as indicated by the connector relay bank designations 203 and 204. A particular connector is selected by a connector pulse from the sensing brush line 205 operative by information openings on the columns 179 and 180 of the information carrier 173 of Figure 10. By this means, a selector 206 of the type before described in Figure 6 effects closure of a selected relay switch 207 thereof to close a circuit from the holding voltage line 195 to a connector line 208 adapted to energize the relays 203 and 204 of a selected connector.

The group selecting or upper-lower case relay bank 192 will complete the circuit for the test signal to either the upper case terminal group or the lower case terminal group. For example, the lower case terminal line 209 will make connection from the "*a*" terminal 193 to all of the "*a*" terminals of all connector relay banks 203. Thus, there is a separate lower case terminal connection made individually to each terminal of each of the connectors. Likewise, the connecting line 210 makes individual connection for each of the upper case terminals. Thus, twenty-six connecting leads would proceed from each terminal, for example, the M terminal of the relay terminals 211 to the twenty-six corresponding terminals, for example, the M terminals of all of the upper case connector relay banks 204 for all of the connectors.

In operation, the signal lights 212 and 213, one for each alphabet terminal of the group selecting relay bank 192, will indicate terminal selection and terminal group selection but will not indicate connector selection. This system is therefore especially useful for the testing of single-ended cables and the like.

Figure 12 shows a complete electrical schematic for a cable testing machine of the apparatus form shown in Figures 1 and 2 utilizing an information carrier card 173 as shown in Figure 10 and embodying a duplex terminal selection system for both the input and output connectors discussed with reference to Figure 11.

In the apparatus of Figures 1, 2, 10 and 12, the information carrier card 173 is passed through sensing apparatus embodying a contact cylinder 214 energized by electrical source 215 connecting to a ground point 216 through a switch arm 217 actuated by the selecting pulse cam 218 driven in synchronism with the cylinder 214 by a common drive relation therewith such as by common shaft indicated by the drive line 219. The common shaft or drive line 219 is driven by a one-revolution magnetically actuated clutch device 220 actuated by a solenoid coil 221, the clutch in turn being driven by motor 222 energized by electrical source 223 as determined by the manual motor switch 224. The holding cam 225 actuating the holding voltage switch 226 connecting the holding voltage source 227 to the holding voltage line 228 follows a cam contour in association with the pulse cam 218 conforming to the corresponding cam configurations of Figure 5. Test cams 229 and 230 likewise follow the corresponding cam configurations of the test cams of Figure 5 to apply consecutive test signals from the test signal sources 231 and 232 having signal indicators **231*a* and 232*a* through the cam actuated switches 233 and 234 respectively to the test signal line 235**.

The input connector 236 of cable 237 being tested may be adapted, for example, to plug into the socket 16 of the fourth group 20 of connectors 16, 18 and 19 on the inlet panel 14 of the apparatus of Figure 1. Likewise, the outlet connector 238 may be adapted to plug into the female connector or socket 17 of the fourth connector group of the outlet panel 15 of Figure 1. Since only six connector groups are shown, only six banks of twenty-six pole relays need be utilized for each of the upper and lower case terminal groups of the connectors.

In the schematic of Figure 12, a bank of relays or a series of selecting relays may be represented by a single relay configuration having a switch. Thus, the input connector banks are represented by the lower case bank relays 239 and upper case relay banks 240 having terminal switches 241 and 242 respectively. The input group selecting relay 243 has group selecting switches 244 distributing a selected terminal signal to either the lower case connector banks 239 through the line 245 or in the energized position, to the upper case connector banks 240 through the lines 246. A terminal selector 247 responsive to upper or lower case terminal selecting pulses from the line 248 accomplishes terminal selection through its series switches 249 to distribute test signal from the test signal line 235 to a selected terminal. The connector selector 250 corresponding to the selector 206 of Figure 11 distributes holding voltage through its selecting switches 251 to energize the selected connector bank relays 239 and 240 responsive to a connector selecting pulse from the sensing brush 252 serving the connector pulse line 253.

The terminal selecting brushes 254 and 255 serving respectively the small alphabet pulse line 256 and large alphabet pulse line 257 connect to relay switches 258 and 259 of the group selecting relay 260 adapted alternatively to make connection through the bridge line 261 to the common terminal pulse line 248. Relay 260 also embodies relay switch 262 adapted when relay 260 is energized by large alphabet pulse line 257 to close switch 262 energizing the pulse coil P of the upper-lower case relays 243 through the line 263. The relay switch 264 likewise forming a part of relay 260, is adapted to energize the small alphabet light 265 with holding voltage when the relay 260 is de-energized. The lower case signal light 265 may correspond to the lower case signal light 31 of Figure 1. If desired, an upper case signal light 266 may also be employed for energization when the relay switch 264 is in the energized position.

The output circuit of the schematic of Figure 12 serving the output connector 238 is similar to the input circuit insofar as the selection of terminals and connectors is concerned. Return signal voltage through a return signal line 267 or 268 will communicate through the closed relay switches 269 and 270 of the energized connector relay banks 271 and 272 respectively, whereby either the appropriate lower case signal light 273 or upper case signal light 274 will be energized. The upper-lower case relay 275 having the double acting switches 276 and actuated by an upper case terminal pulse from line 277 served by relay switch 278 connected to the outlet upper case pulse line 279 having sensing brush 280 determines the selection of upper or lower case terminals in the connector according to energization of the terminal group selecting relay 281 controlling switch 278 and likewise energized by a large alphabet pulse.

Terminal selection for the output connector is made by the terminal selector 282 having series selecting switches 283 as formerly described in communication with a single return line 284 adapted to energize the clutch control 285, the latter being of the form shown in Figure 4 and being adapted to energize the clutch solenoid 221 in the manner formerly described. The terminal selecting relay is energized by terminal pulses from the common terminal pulse line 283 connecting by the bridge line 287 to the relay switches 288 and 289 connecting respectively to the lower case terminal pulse line 290 having sensing brush 291 and the upper case terminal line 279.

The outlet connector selector 292 embodies series selecting switches 293 adapted to distribute holding voltage to selected connector relay banks 271 and 272 through the lines 294. The connector selector 292 is energized by an outlet connector pulse dictated by the sensing brush 295 connecting by line 296 to the pulse coils thereof. The outlet terminal group selecting relay 281 embodies relay switch 297 determining energization of the lower case signal light 298 corresponding to signal light 32 of Figure 1 or to energize an upper case signal light 299, if desired.

The outlet terminal lights 273 and 274 are adapted to be energized by return voltage providing connection has been made to the correct connector. Therefore, the schematic shown in Figure 12, being the same as the system of Figure 11, is particularly adapted to the testing of single ended cables. The lower case input terminal lights 300 and the upper case terminal lights 301 are likewise energized by signal voltage but are energized independent of connections of cable wire to the input connector 236 as will be evident in the following discussion of operation of apparatus according to schematic arrangement of Figure 12 wherein reference will also be made to Figures 10 and 11.

*Section 9.—Typical duplex operation*

Referring to Figures 6, 10 and 12, it will be assumed for purposes of discussion, that the information carrier 173 calls for terminal K in the upper case alphabet of the fourth connector 236 of the input connectors and calls for the lower case terminal *k* in the fourth connector groups 238 of the output connectors. Thus, in Figure 10, the card 173 will be punched in the information column 176 to provide openings 302 and 303 at the second latitude spacing and fifth latitude spacing thereof to close the K alphabet terminal switch $\mathbf{113}_{(5)}$ of the terminal selecting device shown in Figure 6 and previously described. By this means, a double pulse is provided for terminal selection and sensing by the terminal sensing brush 255 connecting through line 257 of Figure 12 to energize the group selecting relay 260 closing relay switch 259 and effecting passage of the selecting signal through the line 248 for selection by the terminal selecting device 247. The K relay switch 249 corresponding to the relay switch $\mathbf{113}_{(5)}$ of Figure 6 will thereby be selected and maintained closed by the holding voltage from line 228 and will connect to the K relay switch of the individual relay switches 244 of the upper-lower case relay 243. When relays 260 and 243 are energized by an upper case terminal pulse, the test signal from line 235 will connect through the *k* relay switch 244 and lines 246 to all upper case K relay switches of the series of upper case relay banks 240 wherein one bank of the latter is provided for each of six connectors.

The selection of the fourth connector is made by punching the card 173 in the connector selecting column 180 as at 196 in the first latitude space and in the seventh latitude space at 197. The connector selecting means 250, energized by the connector pulses, is preferably of the form of selector shown in Figure 6. Thus, referring to Figure 6, it will be apparent that the selection of one connector out of six can be accomplished by utilizing connections therein which correspond to only the first six letters of the alphabet, in which case the present example would call for the energization of relays $\mathbf{110}_{(1)}$ and $\mathbf{110}_{(7)}$ effecting a selection of a terminal D which, when using this selecting device for connector selection, would be connected for the selection of the fourth connector. This form of connector selecting means as the selector 250 applies holding voltage to the selected connector relay banks 239 and 240 of the fourth connector to energize the selected relay banks. Only the upper case connector bank of relays 240 will receive the test signal through the K switch of its series of closed individual relay switches 242 whereby the "K" terminal line 304 will communicate the test signal to K terminal of connector 236 whereas the lower case $_k$ terminal thereof will not receive test signal through the "K" terminal line 305.

As before described with reference to Figure 5, it will be appreciated that all of the selecting operations are made prior to the application of the test signal. Accordingly, the output or return side of the circuitry of Figure 12 will simultaneously accomplish the selection of the fourth connector carrying the lower case terminal *k*. Thus, the information carrier card of Figure 10 will carry the information openings 306 and 307 for "*k*" selection in the lower case column or information row 177 and will also carry openings 308 and 309 selecting the fourth connector of the six output connectors. In this case, however, the group selecting or upper-lower case relay 275 will be de-energized. The terminal selector 282 will be energized by the small alphabet pulse from the line 290 passing through relay switch 288 and passing the terminal selecting pulses through the line 286. The test signal will, as before, pass to the terminal group relay switches 276 but in this case, the K terminal relay switch thereof will be disposed in the de-energized position to make contact with the lower case *k* terminal of the terminal series 310. The terminal group bank relay also referred to as the upper-lower case relay 275 is not energized because the terminal group selecting relay 281 is likewise not energized and the line 277 will therefore carry no signal from the holding voltage line 228. The connector selection is made through the connector selecting device 292 operative by a connector pulse from the line 296 whereby both the upper and lower case output connector relay banks 271 and 272 are energized for the fourth connector group. Accordingly, assuming that the cable 237 being tested is correctly connected and submits to the test signals without failure, the test signal will return through the line 284 to energize the clutch control device 285.

A number of classes of error and failure can occur. The following are of interest:

(*a*) An incorrect terminal connection may be made in the correct connector. A lack of return voltage will stop the machine as before described. A programming of the remaining terminals of the cable will, by a process of elimination, indicate the number of errors in the complete cable being tested. If the machine stops without showing an alphabet light at the output end, then there must be an incorrect connection at the input end. It will be known, therefore, that there is a fault at the input connector for the upper case K connection. It will be known also that the control circuit for the machine is operative, providing the correct terminal light shows at the input end. If no terminal lights show, then the fault is in the machine itself at the input end or in the particular light. If the fault is in the particular light, the machine will continue to operate but the light will not show.

(*b*) In the event of lack of continuity in the line being tested or failure thereof under test, the same result will be obtained as with a faulty connection of the input terminal with the important exception that a further programming of the cable will not bring out cross reference information revealing error. Therefore, the failure must be in the cable itself rather than in the connection.

(*c*) In the event of connection to the correct output connector and the correct alphabet group but the wrong terminal of the alphabet group, then the alphabet light will be illuminated for this wrong terminal.

(*d*) In the event of connection to the correct terminal of the wrong terminal group, in the correct output connector, then the terminal light showing the error will be illuminated because both the upper and lower case banks of relays are closed for the correct connector. It should also be appreciated that if the only error is a connection to the wrong terminal, whether it be upper or lower case in the correct connector, then the terminal lights showing the wrong connection will be energized. Thus, a wrong *k* connection in this example to the *m* terminal, P terminal and the like, will energize these lights to show up the specific fault. Moreover, the return circuit will become incomplete either at the relay switch 276 or at the selector switch 283.

(*e*) If a connection is made to the wrong return connector of a multiple end cable, then the same result will be obtained as for a lack of continuity, except that the further programming of the cable will usually reveal the error by cross reference in a ready manner unless there are many complex errors in the cable.

(*f*) In the event of failure in the return circuit of the machine itself, the machine will stop but the correct signal lights will show if the cable is correct. Since the failure can only occur in that part of the circuitry defined by the signal lights when the machine stops by reason of its own failure, the location of the faults can be readily traced.

(*g*) Any fault either in the machine or in the cable being tested interrupts the test signal and effects stoppage of the machine by failing to energize the clutch control as before described. Accordingly, the machine, if in error, cannot continue to programme a test cable.

*Section 10.—Direct fault indication in multiplex systems*

It will be apparent that if an individual signal light is connected to each terminal of all connectors, a direct fault indication will be given, providing the necessary large array of indicating lights is divided into connector groups and terminal groups. Such a vast number of indicating lights would be impractical; in most cases the number of signal lights can be reduced to a minimum by utilizing a seeking or finding type of circuitry particularly for the return or output circuit.

A simple form of finding circuitry is shown in Figure 13 representing the return circuit of a multiplex system of the type described with reference to Figure 8 under Section 7 of this specification. In this case, the output connectors 309*a* connect through the double pole relay switches 310*a* of the connector relay banks 311. The latter, when energized, connect by alphabet groups to the double pole relay switches 312 of the terminal group bank relays 313, which latter connect by terminal lines to the selecting switches 314 of the terminal selecting device 315 whence a return signal voltage may pass through the line 316 to a clutch control as indicated. The terminal selecting device 315 is energized by a pulse from a terminal pulse line 317. The group selecting device 318 is energized by a group pulse from line 319 and in turn, energizes a selected group bank 313. Also, the connector selector 320 energized by a connector pulse from the line 321 energizes a selected connector relay bank 311.

Assume that the line 322 being tested is connected to the wrong terminal in the wrong terminal group in the wrong connector but carries a test pulse to the incorrect return line 323 making connection through the normally raised de-energized relay switches 310*a* of the connector relay bank serving the connector to which the wrong connection has been made. In the normally open position, all of switches 310*a* engage individual relay contacts 324, all of which are connected by a single line 325 to the pulse coil P of a single two-stack indicating or light relay 326. The relay 326 is therefore energized by any test voltage feeding into its corresponding connector bank of relays 311 and effects closure of its relay switch 327 to energize such bank through line 328 from holding voltage line 329. Light relay 326 is held in energized position by holding voltage applied to its holding coil H. All of the groups of alphabet terminals of the bank 311 will therefore be closed but since only one of the terminals of the connector is carrying the return signal voltage, only the particular terminal line 329 will convey the signal voltage to its own group bank of relays 313. In this case also, any group relay bank in the de-energized position has all of its relay switches in contact with the upper common terminals 330 in each bank whereby the group indicating or light relay 331 will be energized in similar fashion to close the relay switch 332 thereof to effect energization of that particular group bank of relays 313 whereby the group relay switches 312 will be closed, making individual connection of switches 312 to the terminal lines 333 wherein only one of the latter carries a return signal voltage whereby its terminal light 334 becomes energized.

It will be apparent that the connector light 335 adapted to be energized by either the connector selector 320 or the light relay 326, will be energized in the event of any return signal coming through the connector which its connector bank 311 serves. Likewise, the group light 336 will be energized by either the group selector 318 or the light relay 331. Accordingly, a return signal coming into the group relay bank 313 will effect energization of group light 336.

It should be remembered that the terminal light 334 can be energized only by return voltage; that is, return voltage of the test signal, whereas the group and connector lights can be energized either by a return signal voltage or group and connector pulses respectively.

In the event of an incorrect connection; that is, a connection to a wrong connector, a wrong group, or a wrong terminal, it is necessary that the clutch control circuit be opened. It will be seen from the foregoing that a wrongly directed return voltage can proceed into the return line 316 through the terminal selector 315 if an error is made by connecting to the wrong group or the wrong connector but to the correct terminal of such group or connector. In the circumstances, provision is made for interrupting the clutch control circuit in either event. Therefore, the light relays 326 and 331 embody additional relay switches 337 and 338 connected in series in the clutch control or return line 316 whereby energization of either of these groups of relays will sever the clutch control circuit. In the event the terminal is incorrect, the return circuit through the terminal selector 315 will find an open switch 314 so that separate provision need not be made for opening the circuit at this point in the event the group and connector connection is correct.

If, for example, there are in the output circuit, ten groups and ten connectors, then there will be ten connector light relays and ten group light relays. The switches 338 of the connector light relays will be connected in series in the clutch control return line 316. Likewise, the relay switches 337 of the group light relays 331 will be connected in series in line 316 so that of a total of twenty light relays having switches normally connected in series in the clutch control circuit, the energization of any of these relays will open the clutch control circuit. Such energization can only occur in the event test signal voltage finds its way to an unselected and un-energized connector bank 311 or an unselected and un-energized group relay bank 313.

On the other hand, should the connection be correct in all respects, then the connector light 335 will be energized by the selector 320 accompanied by energization of connector bank 311. Likewise, group light 336 will be energized upon selection thereof by selector 318 and the group bank 313. Furthermore, the return signal voltage to the correct terminal will light the correct terminal light 334 and the terminal selector 315 having its selector switch 314 closed, will pass the signal voltage to the clutch control or return line 316 having series relay switches 337 and 338 since the latter will be in their normal upward closed circuit position because the group light relay 331 and connector light relay 326 will not be energized.

An exact identification of connections can be made at the outlet connector providing the circuit is complete thereto. Lack of continuity can arise in the event there is an incorrect connection to the inlet connector. As before mentioned, a single programming of the cable will merely show that a condition of lack of continuity or an error exists in the inlet connector. The trouble can be located by cross reference or more simply, where a direct fault indication is available from the outlet side of the multiplex system as described in this section, then the ends of the cable can be reversed for test and the information carrier cards passed through the machine in reverse arrangement; that is, each card is passed through the apparatus reversed end for end so that the lefthand side of the selection information will become the right-hand side of the selection information and the outlet end of the cable being tested will become the inlet end. The former inlet end can therefore be programmed as an outlet end to obtain complete information and such information will be available in the event there is an error in connection rather than a lack of continuity in the wires of the cable. Therefore, a lack of continuity can be confirmed as due to a cable wire fault rather than a connection fault by a quick reverse passing of the selecting information through the machine with the test cable ends reversed.

Another more simple method of proving out lack of continuity comprises a mere reversal of signal voltage. Thus, referring again to Figure 12, if cable 237 is programmed in one pass of the information carrier cards through the sensing apparatus and there is insufficient information on the input connector 236, a further pass can be run with return line 284 connected to obtain test signal voltage from common line 235*a* and test line 235 connected to return signal voltage to clutch control 285. A conventional manual reversing switch may be employed for this simple switching function which, when utilized with the schematic arrangement of Figure 13 for both the input and output circuits, accomplishes a high degree of testing flexibility and precision.

*Section 11.—Summary*

Without prejudice to other expression of generic concepts set forth in this specification, it is desired to emphasize that when used for the testing of a plurality of conductors in the form of a plurality of circuits to be tested, the checking of connections made to terminals of the connectors may not be of prime interest. In such instance, a fault in the circuit, i.e., conductor being tested, is desired to be ascertained having regard to the ability thereof to pass a predetermined test signal. Accordingly, while the invention will also serve to check the connections of such circuitry to the apparatus herein for test purposes, its primary utility in a more general sense concerns the facilitation of selectively testing a large number of circuits, components and the like.

For example, the application of the invention to the testing of electrical circuitry such as electronic circuitry and the like connected to connectors as set forth herein is contemplated. Aside from general circuit testing usage, the invention may also be employed to detect faults in wiring connections such as, for example, the checking of generator commutator type armatures, multiple tap transformers, multiple connection panelboards, terminal arrays and the like. In each case, however, the conductors in whatever form must be connected to input and output connectors as set forth. In some cases, the connector may be in the form of a simple wire or plurality of wires connected to selector terminals or connector bank relay terminals, as the case may be.

It will also be appreciated that the invention enables the selective testing of a plurality of conductors extending between terminals of a terminal array which may be arranged in input and output connector groups. Generally, the terminal code information for the terminal ends of each conductor is recorded, for example, on a carrier card, magnetic tape or other suitable record means. The recorded terminal code information is then detected from the record means, i.e., carrier card or the like, consecutively for each conductor and a test signal is applied selectively to each conductor responsive to consecutive detection of recorded terminal code information therefor. The response of each conductor to the test signal is indicated by suitable indicating means such as signal lights, for example. As set forth, positive or negative response of the conductor for test signal may be indicated. A negative response indication is accompanied by a machine stoppage as outlined.

While there have been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. Apparatus for testing a plurality of electrical conductors or the like having input and output ends, comprising in combination: at least one input connector having coded terminals to which the input ends of said conductors may be individually connected; at least one output connector having coded terminals to which the output ends of said electrical conductors may be individually connected; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; and means responsive to communication of said signal by said conductor rendering operative said normally inoperative actuating means, thereby effecting continuous selective actuation of said connecting means subject to communication of said test signal by said conductors.

2. Apparatus for testing a plurality of electrical conductors or the like having input and output ends, comprising in combination: a plurality of input connectors each having a different number of coded terminals whereby all of the input ends of said conductors may be connected to one of said connectors having at least a corresponding number of terminals; a plurality of output connectors each having a different number of coded terminals whereby all of the output ends of said conductors may be connected to one of said connectors having at least a corresponding number of terminals; a source of test signal voltage; information carrier means having terminal code information for each end of each conductor; normally inoperative means for selectively actuating said connecting means responsive to terminal code information for both ends of one conductor on said information carrier means to connect said conductor to said source; and means responsive to communication of said signal by said conductor rendering operative said normally inoperative actuating means, thereby effecting continuous selective actuation of said connecting means subject to communication of said test signal by said conductors.

3. Apparatus for testing a plurality of electrical conductors or the like having input and output ends, comprising in combination: a plurality of input connectors of different style, each having coded terminals whereby the input ends of said conductors may be connected to the coded terminals of at least one of said input connectors; a plurality of output connectors of different style, each having coded terminals whereby the output ends of said conductors may be connected to the coded terminals of at least one of said output connectors; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; and means responsive to communication of said signal by said conductor rendering operative said normally inoperative actuating means, thereby effecting continuous selective actuation of said connecting means subject to communication of said test signal by said conductors.

4. Apparatus for testing a plurality of electrical conductors or the like having input and output ends, comprising in combination: at least one input connector group consisting of a plurality of similar style connectors each having a different number of similarly coded terminals; means connecting the similarly coded terminals electrically in parallel to provide a single coded terminal connection for each similar terminal of said connector group whereby the input ends of said conductors may be individually connected to the coded terminals of an input connector having at least a corresponding number of terminals therein; at least one output connector group consisting of a plurality of similar style connectors each having a different number of similarly coded terminals; means connecting the similarly coded terminals electrically in parallel to provide a single coded terminal connection for each similar terminal of said connector group whereby the output ends of said conductors may be individually connected to the coded terminals of an output connector having at least a corresponding number of terminals therein; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; and means responsive to communication of said signal by said conductor rendering operative said normally inoperative actuating means, thereby effecting continuous selective actuation of said connecting means subject to communication of said test signal by said conductors.

5. Apparatus for testing a plurality of electrical conductors or the like having input and output ends, comprising in combination: at least one input connector having groups of coded terminals to which the input ends of said conductors may be individually connected; at least one output connector having groups of coded terminals to which the output ends of said electrical conductors may be individually connected; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; and means responsive to communication of said signal by said conductor rendering operative said normally inoperative actuating means, thereby effecting continuous selective actuation of said connecting means subject to communication of said test signal by said conductors.

6. Apparatus for testing a plurality of electrical conductors or the like having input and output ends, comprising in combination: a plurality of input connectors each having a different number of coded terminals whereby all of the input ends of said conductors may be connected to one of said connectors having at least a corresponding number of terminals; a plurality of output connectors each having a different number of coded terminals whereby all of the output ends of said conductors may be connected to one of said connectors having at least a corresponding number of terminals; a source of test signal voltage; an information carrier card corresponding to each conductor; terminal selecting information located in the form of indexed openings in predetermined spaced apart columns on each card thereby defining terminal code information for both ends of the conductor represented thereby; sensing means adapted to sense the information consecutively from said carrier cards and providing input and output electrical selecting pulses responsive to said information; and input and output connecting means responsive to said input and output selecting pulses for connecting the coded terminal ends of each conductor to said source to effect a passage of said test signal consecutively through said conductors.

7. Apparatus for testing a plurality of electrical conductors or the like having input and output ends, comprising, in combination: a plurality of input connectors of different style, each having coded terminals whereby the input ends of said conductors may be connected to the coded terminals of at least one of said input connectors; a plurality of output connectors of different style, each having coded terminals whereby the output ends of said conductors may be connected to the coded terminals of at least one of said output connectors; a source of test signal voltage; an information carrier card corresponding to each conductor; terminal selecting information in the form of indexed openings in predetermined spaced apart columns on each card thereby defining terminal code information for both ends of the conductor represented thereby; sensing means adapted to sense the information consecutively from said carrier cards and providing input and output electrical selecting pulses responsive to said information; and input and output connecting means responsive to said input and output selecting pulses for connecting the coded terminal ends of each conductor to said source to effect a passage of said test signal consecutively through said conductors.

8. Apparatus for testing a plurality of elecrical conductors or the like having input and output ends, comprising in combination: at least one input connector group consisting of a plurality of similar style connectors each having a different number of similarly coded terminals; means connecting the similarly coded terminals electrically in parallel to provide a single coded terminal connection for each similar terminal of said conductor group whereby the input ends of said conductors may be individually connected to the coded terminals of an input connector having at least a corresponding number of terminals; at least one output connector group consisting of a plurality of similar type connectors each having a different number of similarly coded terminals; means connecting the similarly coded terminals electrically in parallel to provide a single coded terminal connection for each similar terminal of said connector group whereby the output ends of said conductors may be individually connected to the coded terminals of an output connector having at least a corresponding number of terminals; a source of signal voltage; an information carrier card corresponding to each conductor; terminal selecting information in the form of indexed openings in predetermined spaced apart columns on each card thereby defining terminal code information for both ends of the conductor represented thereby; sensing means adapted to sense the information consecutively from said carrier cards and providing input and output electrical selecting pulses responsive to said information; and input and output connecting means responsive to said input and output selecting pulses for connecting the coded terminal ends of each conductor to said source to effect a passage of said test signal consecutively through said conductors.

9. Apparatus for testing a plurality of electrical conductors or the like having input and output ends, comprising in combination: at least one input connector having coded terminals to which the input ends of said conductors may be individually connected; at least one output connector having coded terminals to which the output ends of said electrical conductors may be individually connected; a source of test signal voltage; an information carrier card corresponding to each conductor; terminal selecting information in the form of indexed openings in predetermined spaced apart columns on each card thereby defining terminal code information for each end of the conductor represented thereby; sensing means adapted to sense the information consecutively from said carrier cards and providing input and output electrical selecting pulses responsive to said information; input and output connecting means responsive to said input and output selecting pulses for connecting the coded terminal ends of each conductor to said source to effect a passage of said test signal consecutively through said conductors; normally inactive drive means for said sensing means adapted when actuated to drive the latter for one information selection cycle during which terminal code information is sensed from one information carrier card; and means responsive to communication of a test signal through a selected conductor for actuating said drive means to effect a further cycle of operation of said sensing means.

10. Apparatus for testing a plurality of electrical conductors or the like having input and output ends, comprising in combination: at least one input connector having coded terminals to which the input ends of said conductors may be individually connected; at least one output connector having coded terminals to which the output ends of said electrical conductors may be individually connected; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and indicating means responsive to communication of said signal by said conductor to an unselected terminal.

11. Apparatus for testing a plurality of electrical conductors or the like having input and output ends, comprising in combination: at least one input connector having coded terminals to which the input ends of said conductors may be individually connected; at least one output connector having coded terminals to which the output ends of said electrical conductors may be individually connected; a source of test signal voltage; information carrier means having terminal code information for each end of each conductor indexed thereon; actuable means for selectively connecting the coded terminals ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal and identifying said terminal and the connector of said terminal.

12. Apparatus for testing a plurality of electrical conductors or the like having input and output ends, comprising in combination: a plurality of input connectors each having a different number of coded terminals whereby all of the input ends of said conductors may be connected to one of said connectors having at least a corresponding number of terminals; a plurality of output connectors each having a different number of coded terminals whereby all of the output ends of said conductors may be connected to one of said connectors having at least a corresponding number of terminals; a source of test signal voltage; information carrier means having terminal code information for each end of each conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal.

13. Apparatus for testing a plurality of electrical conductors or the like having input and output ends, comprising in combination: a plurality of input connectors each having a different number of coded terminals whereby all of the input ends of said conductors may be connected to one of said connectors having at least a corresponding number of terminals; a plurality of output connectors each having a different number of coded terminals whereby all of the output ends of said conductors may be connected to one of said connectors having at least a corresponding number of terminals; a source of test signal voltage; information carrier means having terminal code information for each end of each conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal and identifying the connector of said terminal.

14. Apparatus for testing a plurality of electrical conductors or the like having input and output ends, comprising in combination: a plurality of input connectors of different style, each having coded terminals whereby the input ends of said conductors may be connected to the coded terminals of at least one of said input connectors; a plurality of output connectors of different style, each having coded terminals whereby the output ends of said conductors may be connected to the coded terminals of at least one of said output connectors; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal.

15. Apparatus for testing a plurality of electrical conductors or the like having input and output ends, comprising in combination: a plurality of input connectors of different style, each having coded terminals whereby the input ends of said conductors may be connected to the coded terminals of at least one of said input connectors; a plurality of output connectors of different styles, each having coded terminals whereby the output ends of said conductors may be connected to the coded terminals of at least one of said output connectors; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means reesponsive to communication of said signal by said conductor to an unselected terminal identifying said terminal and identifying the connector of said terminal.

16. Apparatus for testing a plurality of electrical conductors or the like having input and output ends, comprising in combination: at least one input connector group consisting of a plurality of similar style connectors each having a different number of similarly coded terminals; means connecting the similarly coded terminals electrically in parallel to provide a single coded terminal connection for each similar terminal of said connector group whereby the input ends of said conductors may be individually connected to the coded terminals of an input connector having at least a corresponding number of terminals therein; at least one output connector group consisting of a plurality of similar style connectors each having a different number of similarly coded terminals; means connecting the similarly coded terminals electrically in parallel to provide a single coded terminal connection for each similar terminal of said connector group whereby the output ends of said conductors may be individually connected to the coded terminals of an output connector having at least a corresponding number of terminals therein; a source of test signal voltage; information carrier means having terminal code information for each end of each conductor indexed thereon; actuable means for selectively connecting the coded terminals ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal.

17. Apparatus for testing a plurality of electrical conductors or the like having input and output ends, comprising in combination: at least one input connector group consisting of a plurality of similar style connectors each having a different number of similarly coded terminals; means connecting the similarly coded terminals electrically in parallel to provide a single coded terminal connection for each similar terminal of said connector group whereby the input ends of said conductors may be individually connected to the coded terminals of an input connector having at least a corresponding number of terminals therein; at least one output connector group consisting of a plurality of similar style connectors each having a different number of similarly coded terminals; means connecting the similarly coded terminals electrically in parallel to provide a single coded terminal connection for each similar terminal of said connector group whereby the output ends of said conductors may be individually connected to the coded terminals of an output connector having at least a corresponding number of terminals therein; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal and identifying the group of the connector thereof.

18. Apparatus for testing a plurality of electrical conductors or the like having input and output ends, comprising in combination: at least one input connector having groups of coded terminals to which the input ends of said conductors may be individually connected; at least one output connector having groups of coded terminals to which the output ends of said electrical conductors may be individually connected; a source of test signal voltage; information carrier means having terminal code information for each end of each conductor indexed thereon; actuable means for selectively connecting the coded terminals ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal identifying said terminal.

19. Apparatus for testing a plurality of electrical conductors or the like having input and output ends, comprising in combination: at least one input connector having groups of coded terminals to which the input ends of said conductors may be individually connected; at least one output connector having groups of coded terminals to which the output ends of said electrical conductors may be individually connected; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected connector, identifying said connector.

20. Apparatus for testing a plurality of electrical conductors or the like having input and output ends, comprising in combination: at least one input connector having groups of coded terminals to which the input ends of said conductors may be individually connected; at least one output connector having groups of coded terminals to which the output ends of said electrical conductors may be individually connected; a source of test signal voltage; information carrier means having terminal code information for each end of each conductor indexed thereon; actuable means for selectively connecting the coded terminal ends of each conductor to said source to effect passage of test signal through said conductor; normally inoperative means for selectively actuating said connecting means responsive to terminal code information for both ends of one conductor on said information carrier means to connect said conductor to said source; means responsive to communication of said signal by said conductor rendering operative said normally inoperative actuating means, thereby effecting continuous selective actuation of said connecting means subject to communication of said test signal by said conductors; and means responsive to communication of said signal by said conductor to an unselected terminal group identifying said group.

References Cited in the file of this patent

UNITED STATES PATENTS

| | | |
|---|---|---|
| 2,328,750 | Smith | Sept. 7, 1943 |
| 2,329,491 | Sulzer | Sept. 14, 1943 |
| 2,622,130 | Kabell | Dec. 16, 1952 |